United States Patent
Maria

(10) Patent No.: US 10,390,257 B2
(45) Date of Patent: Aug. 20, 2019

(54) TRAFFIC PRIORITY FOR LONG TERM EVOLUTION NETWORKS

(71) Applicant: AT&T Mobility II LLC, Atlanta, GA (US)

(72) Inventor: Arturo Maria, Bellevue, WA (US)

(73) Assignee: AT&T Mobility II LLC, Atlanta, GA (US)

(*) Notice: Subject to any disclaimer, the term of this patent is extended or adjusted under 35 U.S.C. 154(b) by 118 days.

(21) Appl. No.: 15/216,329

(22) Filed: Jul. 21, 2016

(65) Prior Publication Data
US 2018/0027444 A1    Jan. 25, 2018

(51) Int. Cl.
H04W 28/02   (2009.01)
H04L 12/833  (2013.01)
H04L 12/851  (2013.01)

(52) U.S. Cl.
CPC ..... H04W 28/0289 (2013.01); *H04L 47/2408* (2013.01); *H04L 47/2458* (2013.01); *H04W 28/0268* (2013.01)

(58) Field of Classification Search
None
See application file for complete search history.

(56) References Cited

U.S. PATENT DOCUMENTS

| 7,046,643 | B1 | 5/2006  | Zellner et al. |
| 8,761,095 | B1 | 6/2014  | O'Brien |
| 8,811,175 | B2 | 8/2014  | Sharma et al. |
| 8,837,418 | B2 | 9/2014  | Smith et al. |
| 8,843,153 | B2 | 9/2014  | Luna et al. |
| 8,867,390 | B2 | 10/2014 | Chen et al. |
| 8,873,395 | B1 | 10/2014 | Prock et al. |
| 8,891,373 | B2 | 11/2014 | Grayson et al. |
| 8,913,987 | B2 | 12/2014 | Lee et al. |

(Continued)

FOREIGN PATENT DOCUMENTS

| EP | 2026514 | 2/2009 |
| FR | 2988948 | 10/2013 |

OTHER PUBLICATIONS

Hallahan, Ryan and Jon M. Peha, "Enabling Public Safety Priority Use of Commercial Wireless Networks," Homeland Security Affairs, hsaj.org, Aug. 2013. https://www.hsaj.org/articles/250 Discloses Allocation and Retention Priority (ARP) mechanisms for assigning QoS levels to different users.

(Continued)

*Primary Examiner* — Mohammad S Adhami

(57) ABSTRACT

A network processor may receive a request from an endpoint device to increase a priority of traffic associated with a first quality of service class indicator, which is associated with a first packet data session quality of service label, and may increase the priority of the traffic in response to the request by sending an instruction to a network element to adjust a mapping of the first quality of service class indicator to a second packet data session quality of service label for the traffic. The network element may label packets in the traffic with the second packet data session quality of service label instead of the first packet data session quality of service label, and components of the network may process the packets labeled with the second packet data session quality of service label with a greater priority than packets labeled with the first packet data session quality of service label.

20 Claims, 3 Drawing Sheets

(56) References Cited

U.S. PATENT DOCUMENTS

| | | | |
|---|---|---|---|
| 8,934,373 | B2 | 1/2015 | Smith et al. |
| 8,971,258 | B2 | 3/2015 | Marocchi et al. |
| 9,001,660 | B1 | 4/2015 | Zhu et al. |
| 9,009,340 | B2 | 4/2015 | Thompson |
| 9,055,557 | B1 | 6/2015 | Bayar et al. |
| 9,083,637 | B2 | 7/2015 | Cheng |
| 9,088,989 | B2 | 7/2015 | Smith et al. |
| 9,288,137 | B2 | 3/2016 | Pedersen |
| 9,319,913 | B2 | 4/2016 | Raleigh et al. |
| 9,338,687 | B2 | 5/2016 | Dahod |
| 2012/0026947 | A1 | 2/2012 | Miller et al. |
| 2012/0087313 | A1* | 4/2012 | Yin ........... H04W 48/16 370/328 |
| 2012/0275310 | A1* | 11/2012 | Watfa ........... H04W 8/082 370/238 |
| 2014/0066082 | A1* | 3/2014 | Anchan ........... H04M 3/00 455/452.1 |
| 2014/0242944 | A1 | 8/2014 | Joul et al. |
| 2014/0355428 | A1 | 12/2014 | Smith et al. |
| 2015/0009826 | A1 | 1/2015 | Ma et al. |
| 2015/0365896 | A1 | 12/2015 | Johansson et al. |
| 2016/0142326 | A1* | 5/2016 | Akiyoshi ........... H04L 45/586 370/236 |
| 2017/0086090 | A1* | 3/2017 | Sharma ........... H04W 28/0268 |

OTHER PUBLICATIONS

"Quality of Service (QoS) and Policy Management in Mobile Data Networks," ixia, ixia.com, 915-2731-01 Rev. D, Dec. 2013. https://www.ixiacom.com/sites/default/files/resources/whitepaper/policy_management.pdf Discloses "how operators can use the emerging 3GPP standards for QoS and policy management to ease network congestion, provide higher service quality."

"Verizon launches private LTE network with QoS differentiation for enterprise apps, IoT," FierceWireless, fiercewireless.com, Sep. 24, 2015. http://www.fiercewireless.com/story/verizon-launches-private-lte-network-qos-differentiation-enterprise-apps-io/Sep. 24, 2015 Discloses solutions from Verizon that offer subscription based solutions for customer service level requirements.

Choudhuri, Indranil, "Quality of Service in an LTE network", Wipro, wipro.com, IND/PMCS/WIPRO, Jan. 2016-Mar. 2016. http://www.wipro.com/documents/quality-of-service-in-an-LTE-network.pdf Discloses effective QoS through policy management and how LTE network elements must incorporate new techniques to manage diverse traffic characteristics of the applications and services.

"AT&T Dynamic Traffic Management," AT&T, wireless.att.com, Jun. 1, 2016. https://www.wireless.att.com/businesscenter/en_US/pdf/att-dynamic-traffic-management-product-brief-010816.pdf Discloses how "AT&T Dynamic Traffic Management uses Quality of Service ("QoS") network technology to enable enterprise and government customers to prioritize their mission-critical business data traffic on the AT&T owned domestic 4G LTE network."

"Bringing QoS Over Wireless LAN into Focus," Aruba White Paper, arubanetworks.com, 2011. http://www.arubanetworks.com/pdf/technology/whitepapers/WP_BringQoSWireless.pdf Discloses "a detailed explanation of Aruba's self-tuning QoS mechanisms and how they ensure the reliable delivery of latency-sensitive voice and video streams."

\* cited by examiner

TRAFFIC PRIORITY FOR LONG TERM EVOLUTION NETWORKS

The present disclosure relates generally to prioritizing traffic in a cellular network, and more particular to devices, computer-readable media, and methods for increasing a priority of traffic associated with an endpoint device based upon a request.

BACKGROUND

In access class barring (ACB), user equipment (UE) may be assigned to one of ten access classes (AC) 0-9, or may be assigned to one of five special categories: access classes 11-15. The access class of a user equipment may be stored in a subscriber identity module (SIM) or in a universal subscriber identity module (USIM). When a radio access network is overloaded, it may implement access class barring to select one or more access classes to block from registering, or to block from assigning to bearer resources of the radio access network.

SUMMARY

In one example, the present disclosure discloses a method, computer-readable medium, and device for increasing a priority of traffic associated with an endpoint device. For example, a processor deployed in a network may receive a request from an endpoint device to increase a priority of traffic associated with the endpoint device. The traffic may be associated with a first quality of service class indicator, and the first quality of service class indicator may be associated with a first packet data session quality of service label. The processor may then increase the priority of the traffic in response to the request. In one example, the increasing the priority of the traffic may include sending an instruction to a network element in the network to adjust a mapping of the first quality of service class indicator to a second packet data session quality of service label for the traffic. The network element may then label packets in the traffic associated with the endpoint device with the second packet data session quality of service label instead of the first packet data session quality of service label, in response to the instruction. In one example, components of the network may process the packets in the traffic labeled with the second packet data session quality of service label with a greater priority than packets labeled with the first packet data session quality of service label.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
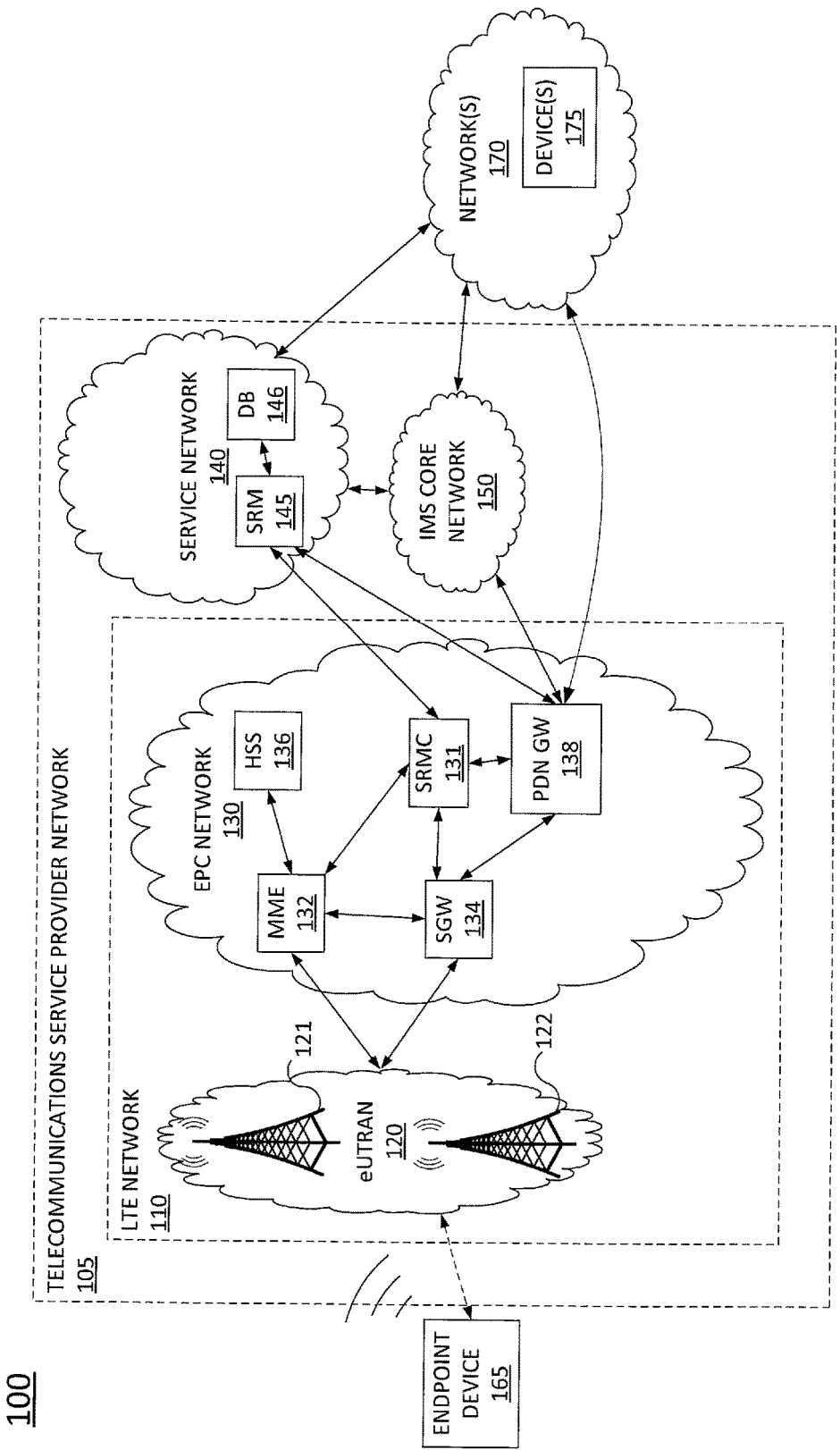
FIG. 1 illustrates an example system related to the present disclosure.

The present disclosure broadly discloses methods, computer-readable media, and devices for increasing a priority of traffic associated with an endpoint device, e.g., within a Long Term Evolution (LTE) cellular network. In particular, in one example, the present disclosure provides a priority-on-demand capability that enables a network operator to allow customers to set Quality of Service (QoS) for traffic from the users' endpoint devices, or user equipment (UE). In one example, dynamic qualities of on-demand QoS provisioning may be accomplished by a systems resource manager (SRM) accessible by users' endpoint devices on the network or from other devices outside of the network. In one example, the systems resource manager (SRM) may interface with a controller, e.g., a systems resource management controller (SRMC), to direct QoS prioritization in the network. For example, the controller may configure eNodeBs by providing information in order to prioritize endpoint devices accessing the network. Alternatively, or in addition, the controller may interface with other network elements in the evolved packet core (EPC) in order to prioritize access to EPC resources, such as gateways, intermediate routers, and other components/network elements.

Access class barring (ACB) provides a method for eNodeB's to prioritize which endpoint devices are allowed to "attach" to the radio access network (RAN). In one example, an endpoint device is a member of one of ten randomly allocated mobile populations, which may be defined as access classes (AC) 0 to 9. In one example, the access class identifier (e.g., the number associated with the access class) is stored in the SIM or USIM of the endpoint device. In addition, the endpoint device may be a member of one or more of five special categories, which may be designated as access classes 11 to 15 and that are assigned to endpoint devices of specific groups of high priority users. If an endpoint device is a member of one or more of access classes 11 to 15, this information may also be held in the SIM/USIM.

QoS class indicators (QCI) are used in LTE networks to allocate resources within the evolved packet core (EPC) and to indicate the priority that traffic is to receive in the network. For instance, there are various different QCIs for different types of guaranteed bit rate (GBR) and non-GBR traffic, such as voice data, conversational and non-conversational video data, gaming data, signaling plane data, and so forth. In addition, the different QCIs may be associated with different priority ranks, packet delay budgets, and packet error loss rates. Traffic may be monitored to determine if the QoS for the QCI is being met. If not, adjustments may be made to the allocation of resources in the network, such as providing a higher bandwidth bearer, routing the traffic via a different path through the network, placing packets in higher priority processing queues in a router, and so on. However, both access class barring and QoS class indicators are not controlled by the user. Access class barring uses pre-provisioned parameters in order to determine which endpoint devices may attach to the radio access network and which endpoint devices may be blocked from attaching to the radio access network. Similarly QoS class indicators are pre-provisioned by the network operator. Thus, the user has very little control over the service provided to traffic once these parameters have been provisioned and are used by the network operator.

In accordance with the present disclosure, the SRM and controller may increase the priority for traffic of an endpoint device using adjustments to the access class identifiers and QoS class indicators used by LTE networks. In one example, the SRM and controller provide an external interface to users that enables on-demand increases (or decreases) to the priority of traffic associated with the users' endpoint devices. Specifically, the SRM may comprise a server that is accessible from devices outside of the network, or from endpoint devices connected via the network, such as another device associated with the user, such as a personal computer connected to the Internet through a digital subscriber line (DSL), fiber optic access network, and so forth. From a requesting device, a user may interact with the SRM through an Internet service and/or an application running on the requesting device in order to select a priority, or a quality of service. In one example, the user may select a priority ranking or a priority level, may select a particular QCI, or may define one or more preferred parameters for the processing of the traffic, which the SRM may map into a QCI and/or access class identifier. In one example, the user may also pay or agree to pay, for the increase to the priority of the traffic through the SRM.

In one example, the SRM may communicate with the controller (e.g., an SRMC), which may configure eNodeB's to provide higher priority to traffic of an endpoint device of a requesting user. For example, the controller may instruct an eNodeB to ignore an access class identifier of the endpoint device, or to create a local association at the eNodeB of the endpoint device to one of the special high priority access classes, e.g., one of classes 11-15. To illustrate, if the radio access network (RAN) is congested, one or more of the access classes may be selected, e.g., randomly, for blocking from attaching to the RAN and/or for blocking from establishing new voice or data calls. If the access class of the endpoint device is selected for blocking, the endpoint device may avoid this treatment by being reassigned to or temporarily associated with a different access class, or one of the special high priority access classes.

In one example, the controller may also direct, or configure various components or network elements in the EPC to provide a higher priority to traffic for endpoint devices of users who have paid or that have otherwise accessed the SRM in order obtain a higher priority of service. In one example, the controller may override QCI parameters and direct certain EPC network elements, such as gateways, to use controller-provided parameters in order to prioritize traffic of the endpoint device in the network. In one example, the present disclosure may also include a database to store provisioning parameters for users of the service, such as user preferences or histories of provisioning and prioritization parameters. The combination of an SRM, controller, database, and supporting network elements may therefore provide users with the capability to request and obtain higher priority service for traffic of the users' endpoint devices from the network on an "on-demand basis." These and other aspects of the present disclosure are discussed in greater detail below in connection with the examples of FIGS. 1-3.

It should be noted that as referred to herein, "traffic" may comprise all or a portion of a transmission, e.g., a sequence or flow, comprising one or more packets, segments, datagrams, frames, cells, protocol data units, service data unit, bursts, and so forth. The particular terminology or types of data units involved may vary depending upon the underlying network technology. Thus, the term "traffic" is intended to refer to any quantity of data to be sent from a source to a destination through a network. In addition, the term "packet" is intended to refer to various types of units that may comprise a flow of traffic. In addition, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

To better understand the present disclosure, FIG. 1 illustrates an example network, or system 100 that may implement embodiments of the present disclosure for increasing a priority of traffic associated with an endpoint device. In one example, the system 100 includes a telecommunications service provider network 105. The telecommunications service provider network 105 may comprise a Long Term Evolution (LTE) network 110, a service network 140, and a core network, e.g., an IP Multimedia Subsystem (IMS) core network 150. The system 100 may further include other networks 170 connected to the telecommunications service provider network 105. As shown in FIG. 1, the system 100 may connect endpoint device 165 with systems resource manager (SRM) 145 in service network 140, with devices 175 in networks 170, and/or with other components of telecommunication service provider network 105. The endpoint device 165 may comprise a cellular telephone, a smartphone, a tablet computing device, a laptop computer, a pair of computing glasses, a wireless enabled wristwatch, or any other wireless and/or cellular-capable mobile telephony and computing device (broadly, a "mobile endpoint device").

In one example, the LTE network 110 comprises an access network and a core network. For example, as illustrated in FIG. 1, LTE network 110 may comprise an evolved Universal Terrestrial Radio Access Network (eUTRAN) 120 and an evolved packet core (EPC) network 130. The eUTRANs are the air interfaces of the $3^{rd}$ Generation Partnership Project (3GPP) LTE specifications for mobile networks. In one example, EPC network 130 provides various functions that support wireless services in the LTE environment. In one example, EPC network 130 is an Internet Protocol (IP) packet core network that supports both real-time and non-real-time service delivery across a LTE network, e.g., as specified by the 3GPP standards. In one example, all eNodeBs, e.g., including eNodeBs 121 and 122 in the eUTRAN 120, are in communication with the EPC network 130. In operation, LTE user equipment or user endpoints (UE), such as endpoint device 165, may access wireless services via the eNodeBs 121 and 122 located in eUTRAN 120. It should be noted that any number of eNodeBs can be deployed in an eUTRAN.

In EPC network 130, network devices Mobility Management Entity (MME) 132 and Serving Gateway (SGW) 134 support various functions as part of the LTE network 110. For example, MME 132 is the control node for the LTE access networks, e.g., including eUTRAN 120. In one embodiment, MME 132 is responsible for user equipment tracking and paging (e.g., such as retransmissions), bearer activation and deactivation process, selection of the SGW, e.g., SGW 134, and user authentication. In one embodiment, SGW 134 routes and forwards user data packets, while also acting as the mobility anchor for the user plane during inter-eNodeB handovers and as the anchor for mobility between LTE and other wireless technologies, such as 2G and 3G wireless networks.

In addition, EPC (common backbone) network 130 may comprise a Home Subscriber Server (HSS) 136 that contains subscription-related information (e.g., subscriber profiles), performs authentication and authorization of a wireless service user, and provides information about the subscriber's location. The EPC network 130 may also comprise a packet data network (PDN) gateway 138 which serves as a gateway that provides access between the EPC network 130 and various data networks, e.g., service network 140, IMS core network 150, networks 170, and the like. The packet data network gateway 138 is also referred to as a PDN gateway, a PDN GW or a PGW.

In one example, service network 140 may comprise one or more devices for providing services to subscribers, customers, and or users. For example, telecommunications service provider network 105 may provide a cloud storage service, web server hosting, and other services. As such, service network 140 may represent aspects of telecommunications service provider network 105 where infrastructure for supporting such services may be deployed. In the example of FIG. 1, service network 140 may include a server, which may be referred to herein a system relationship manager (SRM) 145. In one example, SRM 145 may comprise a computing system, such as computing system 300 depicted in FIG. 3, specifically configured to perform various steps, functions, and/or operations for increasing a priority of traffic associated with an endpoint device, in accordance with the present disclosure. In one example, service network 140 may also include a database (DB) 146, e.g., a physical storage device integrated with SRM 145, or attached or coupled to the SRM 145, to store parameters for users of the service, such as user preferences or histories of provisioning and prioritization parameters.

In one example, networks 170 may represent one or more enterprise networks, a circuit switched network (e.g., a public switched telephone network (PSTN)), a cable network, a digital subscriber line (DSL) network, a metropolitan area network (MAN), an Internet service provider (ISP) network, and the like. In one example, the other networks 170 may include different types of networks. In another example, the other networks 170 may be the same type of network. In one embodiment, devices 175 may include personal computers, desktop computers, laptop computers, personal digital assistants (PDAs), tablet computing devices, circuit-switched or packet communications-based telephones, or any other wireless and/or wired communication enabled computing device. In one example, endpoint device 165 may be connected to one of devices 175 via PDN GW 138, and/or via PDN GW 138 and IMS core network 150.

As mentioned above, system 100 may include SRM 145 which may perform various steps, functions, and/or operations for increasing a priority of traffic associated with an endpoint device, in accordance with the present disclosure. In one example, SRM 145 may provide an interface for users to request increases (or decreases) to the priority of traffic associated with the users' endpoint devices. In one example, a user of endpoint device 165 may connect to SRM 145 via eNodeB 122, SGW 134, and PDN GW 138. In another example, the user may connect to SRM 145 from one of devices 175 through IMS core network 150 and or through the Internet in general. For instance, SRM 145 may comprise a public-facing web server that may be accessed through a browser or other application in order to receive requests to increase a priority of traffic, to receive parameters related to such requests, to interact with requesting devices to receive further information and/or to receive payments, and so forth. For example, upon connecting to SRM 145 from one of devices 175, SRM 145 may request an identification of an endpoint device to which the request to increase the priority of traffic pertains. In one example, SRM 145 may also request at least one parameter associated with the request. For instance, SRM 145 may ask a user to provide a requested QCI, a requested minimum bandwidth, a preferred maximum latency or packet delay, a preferred maximum jitter, a preferred maximum packet error loss rate, or the like. In one example, SRM 145 may refer to database 146 to suggest parameters. For instance, database 146 may store a list of parameters based upon previous user requests to increase the priority of traffic associated with an endpoint device. Thus, SRM 145 may suggest a parameter based upon the last request, suggest parameters based upon the last several requests, and so forth. Alternatively, or in addition, a user may set preferences for one or more parameters for requests to increase a priority of traffic, which may be saved in database 146. Thus, in one example, SRM 145 may offer to a user to select one or more of the user's saved parameters or to select one or more different parameters.

In one example, system 100 may also include a controller, e.g., systems resource manager controller (SRMC) 131, in EPC network 130. SRMC 131 may comprise a server to receive instructions from SRM 145, to interact with and configure gateways and/or other network elements components within EPC network 130 in response to such instructions, and/or to perform other operations in accordance with the present disclosure. In one example, SRMC 131 may comprise a computing system, such as computing system 300 depicted in FIG. 3, specifically configured to provide one or more functions for increasing a priority of traffic associated with an endpoint device, in accordance with the present disclosure. For instance, a request to increase the priority of traffic associated with endpoint device 165 may be received by SRM 145 from one of devices 175. SRM 145 may then instruct SRMC 131 to allocate resources within EPC network 130 in order for endpoint device 165 to receive the requested priority. In one example, SRMC 131 may communicate with MME 132 to determine resources that may be currently assigned to process the traffic from endpoint device 165. For instance, MME 132 may respond to SRMC 131, identifying SGW 134 and PDN GW 138 as being in a service path for traffic of endpoint device 165. For instance, one of the responsibilities of MME 132 in EPC network 130 may be the selection and assignment of SGWs and PDN GWs for servicing traffic for various endpoint devices.

After receiving information regarding resources that are processing the traffic for endpoint device 165, in one example SRMC 131 may then contact eNodeB 121, eNodeB 122, SGW 134, and/or PDN GW 138 in order to configure, or to reconfigure the respective components for processing traffic of endpoint device 165 with an increased priority. For instance, SRMC 131 may instruct eNodeB 122 to adjust a mapping of a QoS class indicator for traffic from the endpoint device 165 to a different packet data session QoS label. In particular, the traffic may be identified as being one of several different types of traffic and may be assigned a QCI that is associated with that type of traffic by the eNodeB 122. In addition, eNodeB 122 and/or SGW 134 may typically map the QCI to a differentiated services code point (DSCP). In one example, DSCP is a field that may be used in an Internet Protocol (IP) packet header which signals a quality of service treatment for the IP packets at the network layer.

In one example, telecommunication service provider network 105 may have a default mapping that is utilized to map QCIs to DSCPs. Any intermediate components within EPC network 130 may thus use DSCPs to determine how to handle various packets or flows. For example, there may be any number of intermediate routers, e.g., layer 3 (L3) routers, within EPC network 130 between eNodeB 122 and SGW 134 (e.g., an S1 link), between SGW 134 and PDN GW 138, and so on. Any such routers receiving a packet from eNodeB 122 to PDN GW 138 that is part of the traffic of endpoint device 165 may therefore be handled in accordance with the DSCP contained in the packet header. In one example, the SRMC 131 may therefore instruct the eNodeB 122 to adjust the mapping of a QCI to a DSCP such that the traffic of endpoint device 165 may receive a higher priority. For instance, a user may select to have non-conversational video traffic for the endpoint device 165 be given a same priority as conversational voice. In one example, the non-conversational video traffic may have a QCI of 4 which is mapped to a particular DSCP, while the conversational voice traffic may have a QCI, having a higher priority than the QCI of 4, which is mapped to a different DSCP. Accordingly, the non-conversational video traffic of endpoint device may be mapped to the different DSCP associated with the QCI of 1 (normally associated with conversational voice traffic) instead of the DSCP associated with the QCI of 4. Alternatively, or in addition, SGW 134 and PDN GW 138 may comprise label switched routers that route packets through EPC network 130 using labels which may be define different paths through EPC network 130. Accordingly, in one example a label, and hence a path that is selected through the EPC network 130 may depend upon the DSCP for the packet, e.g., as an alternative or in addition to the source and destination addresses, and so on. Thus, the priority of the traffic for endpoint device 165 may be increased by adjusting the QCI to DSCP mapping.

The foregoing is just one example of how the priority of the traffic for endpoint device 165 may be increased in accordance with the present disclosure. Thus, it should be noted that the priority of the traffic for endpoint device 165 may be increased in a variety of other ways, which may depend upon a particular type of traffic for which priority is requested, one or more parameters associated with the request, e.g., a requested QCI, a requested minimum bandwidth, a preferred maximum latency or packet delay, a preferred maximum jitter, a preferred maximum packet error loss rate, or the like, or which may depend upon the state of the EPC network 130 and/or one or more components therein, and so forth. For instance, a request may identify a specific QCI that is preferred. However, in another example, a user may simply specify one or more parameters of the request, and SRM 145 may allocate a QCI that satisfies the parameter(s). In one example, the SRM 145 may make further adjustments in order to satisfy the parameters. For instance, a requested priority may be satisfied by allocating a different bearer in the eUTRAN 120 in addition to changing the QCI of the traffic to cause the handling of the traffic in EPC network 130 to be prioritized.

In this regard, it should be noted that the ability of the telecommunications service provider network 105 to increase the priority of traffic for endpoint device 165 may also depend upon the state of the endpoint device 165, upon the state of the radio access network, e.g., eUTRAN 120, and/or upon the state of a source/destination of the traffic to/from the endpoint device 165. For example, a certain priority may be requested for endpoint device 165. However, if endpoint device 165 is still far away from the nearest eNodeB, is in a noisy environment, is in an area where a natural disaster has occurred, and so on, it may not be possible or practical to provide the increased priority to the traffic. Therefore, in one example, SRM 145 and/or SRMC 131 may communicate with various components/network elements within telecommunications service provider network 105 to determine the health, capacity, operating states, and the like of such components in order to assess whether the increase to the priority of the traffic for endpoint device 165 can be accommodated. If it is determined that the request cannot be fulfilled, or if it is otherwise determined that the request should not be fulfilled, e.g., due to priority of true emergency traffic, the SRM 145 may respond to the requesting device that the request is denied. However, in one example, the request may be to have the traffic of a first type receive the same treatment as traffic of a different type that has a higher priority. Thus, while the telecommunications service provider network 105 may not be able to guarantee that specific parameters such as a particular latency be met, it is still possible to have non-conversational video traffic for the endpoint device 165 be given a same priority as conversational voice, for example.

As an alternative, or in addition to adjusting the allocation of resources, and configuring and reconfiguring components of the EPC network 130, SRM 145 and/or SRMC 131 may also cause an access class barring (ACB) plan to be modified to accommodate a different treatment of endpoint device 165. For example, endpoint device 165 may normally be subject to access class barring based upon an access class identifier stored in the SIM/USIM of the endpoint device. However, the request for increased priority for endpoint device 165 may include a request that endpoint device 165 be excluded from blocking or that a likelihood of blocking be decreased. In another example, an exemption for access class barring may be provided as an included feature of any request to increase the priority of the traffic. For example, SRM 145 and/or SRMC 131 may instruct eNodeB 121 and/or eNodeB 122 to ignore an access class identifier of the endpoint device, to create a local association at the eNodeB of the endpoint device to a different access class or to one of the special high priority access classes, e.g., one of classes 11-15, and so forth. To illustrate, endpoint device 165 may be closest to eNodeB 122 and/or have a highest received signal strength from eNodeB 122. However, eNodeB 122 may be overloaded and may implement access class barring. In addition, the access class barring may implicate the access class of the endpoint device 165. Thus, endpoint device 165 should be blocked from call setup via eNodeB 122. However, if increased priority is requested for endpoint device 165, the SRM 145 and/or SRMC may instruct eNodeB 122 to provide an exception to endpoint device 165, or to adjust an entry in a table utilized by eNodeB 122 such that endpoint device 165 is associated with a high priority access class instead of the access class associated with the access class identifier stored in the SIM/USIM of the endpoint device 165. As such, endpoint device 165 may be permitted to establish a voice or data call, while other endpoint devices in the access class would still be subject to the access class barring.

It should be noted that the system 100 has been simplified. In other words, the system 100 may be implemented in a different form than that illustrated in FIG. 1. For example, the system 100 may be expanded to include additional networks, such as network operations center (NOC) networks, additional eUTRANs, and so forth. The system 100 may also be expanded to include additional network elements such as border elements, routers, switches, policy servers, security devices, gateways, a content distribution network (CDN) and the like, without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, various elements of eUTRAN 120, EPC network 130, and IMS core network 150 are omitted for clarity, including gateways or border elements providing connectivity between such networks, internal routers within EPC network 130, and so on. Similarly, due to the relatively large number of connections available between devices in the system 100, various links between MME 132, SGW 134, eNodeBs 111 and 112, SRMC 131, PDN GW 138, SRM 145, and other components of system 100 are also omitted for clarity.

In addition, although aspects of the present disclosure have been discussed above in the context of a long term evolution (LTE)-based network, examples of the present disclosure are not so limited. For example, the teachings of the present disclosure can be applied to other types of wireless networks (e.g., a 2G network, a 3G network, and the like, or a future technology or standard-based network). Similarly, although the SRM 145 and DB 146 are illustrated as components of service network 140, and SRMC 131 is illustrated as a component within EPC network 130, in other examples, any one or more of these components may be deployed in a different configuration. For example, SRMC 131 may reside within service network 140 and may communicate with components in EPC network 130 via PDN GW 138, for example. In another example, the SRM 145 and SRMC 131 may be combined into a single component within EPC network 130 or in service network 140. In still another example, contents of database 146 may instead be deployed within HSS 136. Thus, these and other modifications are all contemplated within the scope of the present disclosure.

Figure 2:
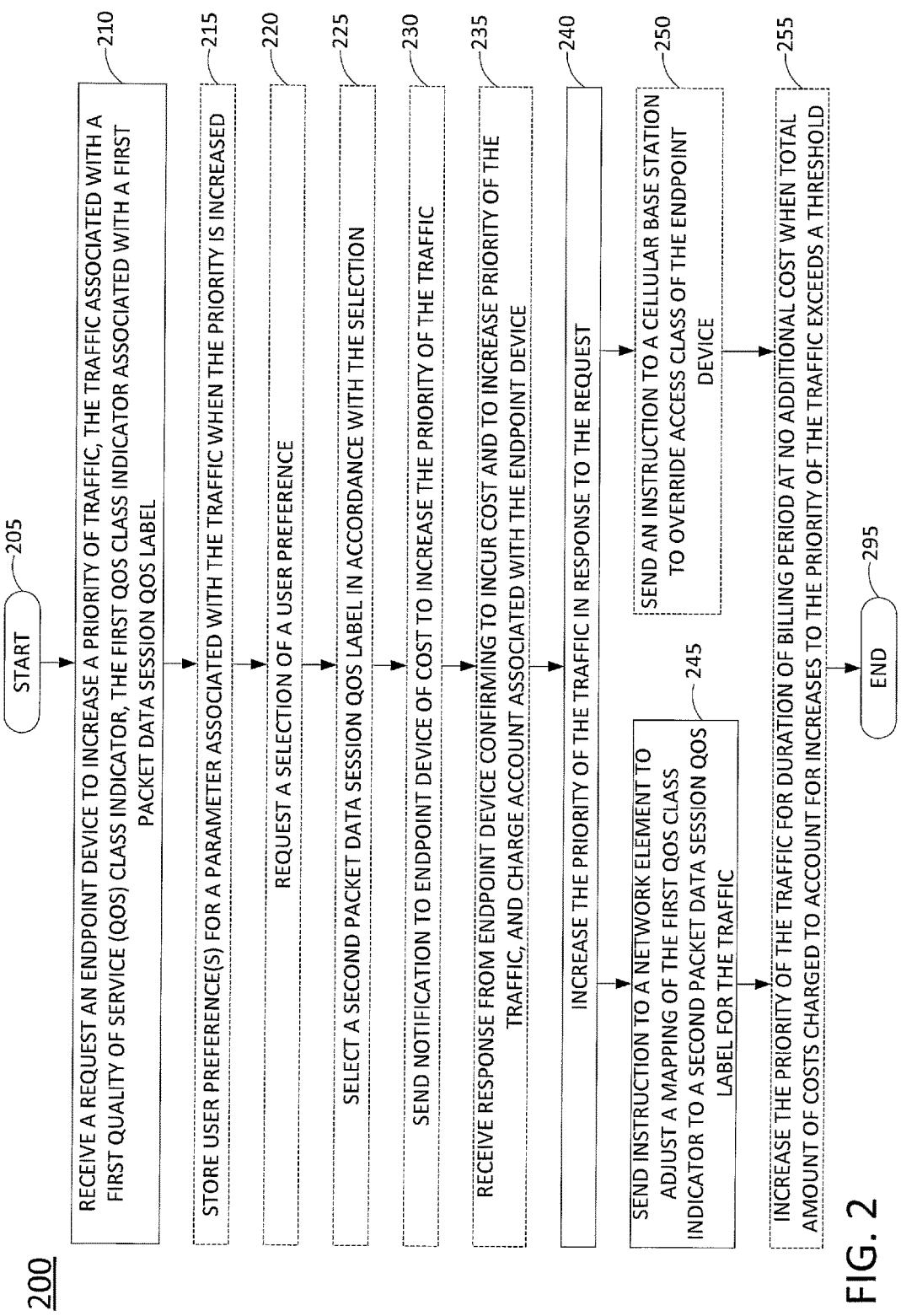
FIG. 2 illustrates a flowchart of an example method for increasing a priority of traffic associated with an endpoint device.

FIG. 2 illustrates a flowchart of an example method 200 for increasing a priority of traffic associated with an endpoint device, in accordance with the present disclosure. In one example, steps, functions and/or operations of the method 200 may be performed by a network-based device, such as SRM 145 or SRM 145 in conjunction with other components of the system 100, such as SRMC 131. In one example, the steps, functions, or operations of method 200 may be performed by a computing device or system 300, and/or processor 302 as described in connection with FIG. 3 below. For instance, computing device or system 300 may represent an SRM, or an SRM integrated with an SRMC of the present disclosure. For illustrative purposes, the method 200 is described in greater detail below in connection with an example performed by a processor, such as processor 302. The method begins in step 205 and proceeds to step 210.

At step 210, the processor receives a request from an endpoint device to increase a priority of traffic associated with the endpoint device in the network. The network may comprise a cellular network, such as an LTE network. In one example, the network may utilize an IP backbone for communications across the network, and between and among components of the network. The traffic may be associated with a first QoS class indicator (QCI), and the first QoS class indicator may be associated with a first packet data session QoS label, such as a differentiated services code point (DSCP), a type of service (ToS) label, or the like. In one example, the request may identify a particular type of traffic, from among a plurality of different types of traffic, for which an increase to the priority of the traffic is requested. In one example, the request may identify a destination (or source) for which the increase to the priority of the traffic is requested when the traffic is between the endpoint device and the destination (or source). The destination (or source) may be identified by, for example: a network address, a range of network addresses, a subnet, a uniform resource locator (URL), or a telephone number. In one example, the request may indicate a duration of time for the increase to the priority of the traffic. For instance, a user may be travelling on business and may need to review an important video presentation before entering a meeting. The user may therefore request an increase to the priority of the traffic for the user's endpoint device for a selected amount of time, after which the increase to the priority may no long be needed or desired.

In one example, the request may include at least one parameter that is desired for the traffic when the priority is increased, such as: a minimum bandwidth, a maximum latency, a maximum jitter, a maximum call blocking, or a maximum packet loss. In another example, the parameter may comprise a different QoS class indicator, or a second packet data session QoS label (e.g., a DSCP, ToS label, or the like that is different from the first data session QoS label). In another example, the parameter may comprise a different type of traffic. For instance, a user of the endpoint device may request that the traffic of a first type receive a same handing or processing as traffic of a different type (e.g., traffic of a type that receives higher priority with respect to any one or more of a packet delay budget, packet error loss rate, jitter, bandwidth/bit rate, call blocking rate, and so on).

At optional step 215, the processor may store one or more user preferences for a parameter associated with the traffic when the priority of the traffic is increased. For instance, the one or more parameters may include: a minimum bandwidth, a maximum latency, a maximum jitter, a maximum call blocking, a maximum packet loss, a QoS class indicator, a second packet data session QoS label, and so on. In one example, the user preferences are stored based upon parameters of past requests made by the user or made in connection with the endpoint device. In another example, preferences for one or more parameters may be entered by a user and saved for future use.

At optional step 220, the processor may request a selection of a user preference. For example, as mentioned above, a user's preferences for one or more parameters may be saved. Thus, in one example, the processor may offer to a user to select one or more of the saved parameters. Alternatively, or in addition, if the request received at step 210 does not contain any requested parameters, or includes parameters that the processor cannot guarantee, the processor may prompt the user to select one or more different parameters.

At optional step 225, the processor may select a second packet data session QoS label in accordance with the selection that is requested at optional step 220. For instance, if a parameter selected comprises a second QoS class indicator, the second packet data session QoS label that is selected may be one that is mapped to the second QoS class indicator. It should be noted that the type of traffic for the endpoint device for which the increase to the priority is requested may be associated with a first QoS class indicator that is otherwise mapped to the first packet data session QoS label. However, in accordance with the present disclosure the traffic may instead be mapped to the second packet data session QoS label, where packets having the second packet data session QoS label may receive a greater priority of processing or handling in the network. In another example, the second packet data session QoS label that is selected may correspond to another parameter that is provided by the user, such as a minimum bandwidth, a maximum latency, a maximum jitter, a maximum call blocking, a maximum packet loss, and so on.

At optional step 230, the processor may send a notification to the endpoint device of a cost to increase the priority of the traffic. For example, the processor may determine a cost based upon the additional resources that may be allocated to handing the traffic of the endpoint device, the time of day, the magnitude of the difference in one or more aspects of service between a default priority handling and the handling according to the increase to the priority, and so on. The processor may then send the notification with the cost that is determined.

At optional step 235, the processor may receive a response from the endpoint device confirming to incur the cost and to increase the priority of the traffic. When such a response is received, the processor may then charge an account associated with the endpoint device for the cost. In addition, the processor may continue to step 240 and subsequent steps of the method 200.

At step 240, the processor increases the priority of the traffic in response to the request that is received at step 210. In one example, the increasing the priority of the traffic may comprise operations of sub-step 245, operations of sub-step 250, or operations of both sub-steps 245 and 250.

In one example, sub-step 245 may involve sending an instruction to a network element of the network to adjust a mapping of the first QoS class indicator to a second packet data session QoS label for the traffic. The network element may comprise a cellular base station, such as a base transceiver station (BTS), a NodeB, or an eNodeB, a serving gateway (SGW), or a packet data network gateway (PGW). In one example, the second packet data session QoS label is selected in accordance with one or more parameters specified by the user in the request that is received at step 210 or specified in the selection mentioned in steps 220 and 225, such as: a minimum bandwidth, a maximum latency, a maximum jitter, a maximum call blocking, a maximum packet loss, second QoS class indicator, and so on. In another example, the user may specify the second packet data session QoS label. In one example, the instruction may be sent from the processor to an intermediate device (such as SRMC 131 in FIG. 1), which may further communicate with the network element to cause the network element to adjust the mapping. Accordingly, the network element may label packets in the traffic associated with the endpoint device with the second packet data session QoS label instead of the first packet data session QoS label, in response to the instruction. In addition, components of the network may process the packets in the traffic labeled with the second packet data session QoS label with a greater priority than packets labeled with the first packet data session QoS label. For example, processing packets with increased or greater priority may comprise network elements placing packets in processing queue(s) with higher priority, routing the packets on a greater bandwidth link, routing the packets on a lower latency path, and so on. The components of the network may include the network elements mentioned above, e.g., base stations, SGWs, and PGWs, in addition to other network elements such as intermediate routers, switches, and the like, a mobility management entity MME, and so on.

In one example, not all of the traffic of the endpoint device is subjected to the increased priority. Thus, components of the network may first determine whether traffic is of a type of traffic for which the increased priority is requested, whether a source or destination of the traffic matches a source or destination specified by the user, and so forth. The type of traffic may be determined based upon an application or protocol that is utilized, based upon a type of content, and so on. In one example, one or more network elements may implement deep packet inspection (DPI) to determine a type of content in the traffic, or may determine the type of content from information contained in packet headers of the traffic, based upon the sending application on an endpoint device, based upon a port number, etc. Similarly, a source and/or a destination of a packet may be determined based upon IP addresses, URLs, and so forth contained in a packet header. Thus, when network elements determine that the traffic is traffic for the endpoint device, that the traffic is of a selected type, and/or that the source(s) and destination(s) match the request, the traffic may be handled with the increased priority.

In one example, optional sub-step 250 may comprise sending an instruction to a cellular base station, e.g., a NodeB, an eNodeB, a base transceiver station (BTS), or the like, to override an access class of the endpoint device, in response to the request that is received at step 210. In one example, the cellular base station may determine the access class of the endpoint device based upon an access class identifier that may be stored in a SIM or USIM of the endpoint device. In one example, the processor may instruct the cellular base station to ignore the access class identifier, or to create a local association at the cellular base station of the endpoint device to a different access class, or to a special high priority access class. To illustrate, if the radio access network (RAN) is congested, one or more of the access classes may be selected, e.g., randomly, for blocking from attaching to the RAN. If the access class of the endpoint device is selected for blocking, the endpoint device may avoid this treatment by being reassigned to or temporarily associated with a different access class, or one of the special high priority access classes. Following sub-step 245 and/or optional sub-step 250, the method 200 may proceed to step 295 or may proceed to optional step 255.

At optional step 255, the processor may increase the priority of the traffic for the duration of a billing period at no additional cost when the total amount of costs for increases to the priority of the traffic associated with the endpoint device charged to an account associated with the user or endpoint device during the billing period exceeds a threshold cost. Thus, in one example, optional step 255 may comprise tracking a total amount of costs charged to the account for increases to the priority of the traffic associated with the endpoint device in a billing period. Following optional step 255, the method 200 may proceed to step 295 where the method 200 ends.

It should be noted that the method 200 may be expanded to include additional steps. For instance, in one example the processor may further provide a higher bandwidth bearer for the traffic of the endpoint device by sending an instruction to an eNodeB to select a higher bandwidth bearer for the traffic, or by sending an instruction to an SRMC to configure the eNodeB to select a higher bandwidth bearer, and so on. In another example, the processor may send a response to the endpoint device after step 210 or after step 220 if the processor determines that the priority of the traffic that is requested cannot be fulfilled. For example, the processor may communicate with various components/network elements to determine the health, capacity, operating states, and the like of such components in order to assess whether the increase to the priority of the traffic for the endpoint device can be accommodated. If it is determined that the request cannot be fulfilled, or if it is otherwise determined that the request should not be fulfilled, e.g., due to priority of true emergency traffic, the processor may respond to the endpoint device that the request is denied, or may solicit a different parameter or set of parameters that may call for less resource usage or the usage of different resources of the network that may be accommodated. Thus, these and other modifications are all contemplated within the scope of the present disclosure.

In addition, it should be noted that although not specifically specified, one or more steps, functions or operations of the method 200 may include a storing, displaying and/or outputting step as required for a particular application. In other words, any data, records, fields, and/or intermediate results discussed in the method 200 can be stored, displayed and/or outputted to another device as required for a particular application. Furthermore, steps or blocks in FIG. 2 that recite a determining operation or involve a decision do not necessarily require that both branches of the determining operation be practiced. In other words, one of the branches of the determining operation can be deemed as an optional step. In addition, one or more steps, blocks, functions, or operations of the above described method 200 may comprise optional steps, or can be combined, separated, and/or performed in a different order from that described above, without departing from the example embodiments of the present disclosure.

As such, the present disclosure provides at least one advancement in the technical field of cellular network resource management and configuration. For instance, examples of the present disclosure include network-based devices for increasing a priority of traffic associated with an endpoint device. In particular, examples of the present disclosure implement traffic prioritization in inbound or outbound traffic from an endpoint device through new network based devices such as an SRM and/or SRM in conjunction with an SRMC, under the control of an endpoint device or other device of a user that is associated with the endpoint device for which traffic is prioritized. In addition, examples of the present disclosure improve the functioning of a computing device, e.g., a server. Namely, servers dedicated to enforcement of traffic priority rules are improved in the examples of the present disclosure, such as the systems resource manager (SRM) and the systems resource manager controller (SRMC) as described herein, which manage and implement on-demand priority increases for traffic of various endpoint devices.

Figure 3:
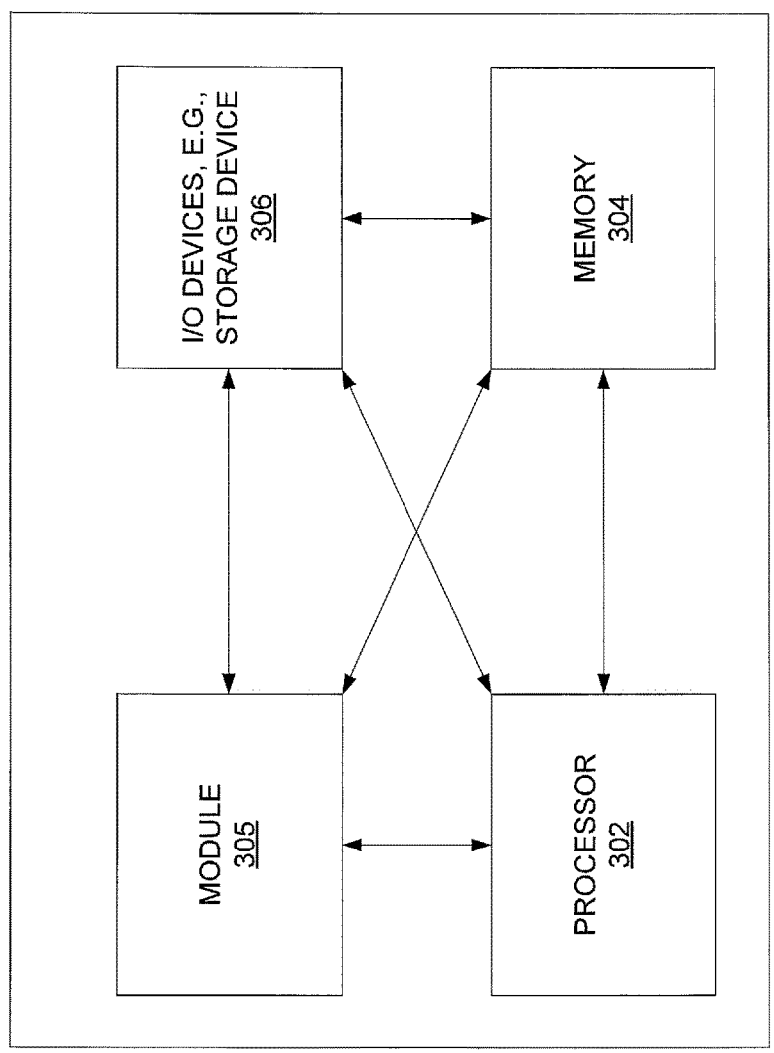
FIG. 3 illustrates an example high-level block diagram of a computer specifically programmed to perform the steps, functions, blocks, and/or operations described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for increasing a priority of traffic associated with an endpoint device, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200 as discussed above is implemented in a distributed or parallel manner for a particular illustrative example, i.e., the steps of the above method 200, or the entire method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for increasing a priority of traffic associated with an endpoint device (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for increasing a priority of traffic associated with an endpoint device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:
1. A device comprising:
a processor deployed in a network; and
a computer-readable medium storing instructions which, when executed by the processor, cause the processor to perform operations, the operations comprising:

receiving a request from an endpoint device to increase a priority of traffic associated with the endpoint device, wherein the traffic is associated with a first quality of service class indicator, and wherein the first quality of service class indicator is associated with a first packet data session quality of service label; and increasing the priority of the traffic in response to the request, the increasing the priority of the traffic comprising:

sending an instruction to a network element in the network to adjust a mapping of the first quality of service class indicator to a second packet data session quality of service label for the traffic, wherein the network element labels packets in the traffic associated with the endpoint device with the second packet data session quality of service label instead of the first packet data session quality of service label, in response to the instruction, and wherein components of the network process the packets in the traffic labeled with the second packet data session quality of service label with a greater priority than packets labeled with the first packet data session quality of service label; and sending, in response to the request, an instruction to a cellular base station of the network to override an access class of the endpoint device, when the access class of the endpoint device is determined to be one of a first plurality of access classes, wherein the network implements the first plurality of access classes and a second plurality of access classes, and wherein the second plurality of access classes has a greater priority in the network than the first plurality of access classes.

2. The device of claim 1, wherein the first packet data session quality of service label and the second packet data session quality of service label comprise differentiated services code points.

3. The device of claim 1, wherein the first packet data session quality of service label and the second packet data session quality of service label comprise type of service labels.

4. The device of claim 1, wherein the request from the endpoint device to increase the priority of the traffic associated with the endpoint device includes at least one parameter comprising:
a minimum bandwidth;
a maximum latency;
a maximum jitter;
a maximum call blocking;
a maximum packet loss;
a second quality of service class indicator; or
the second packet data session quality of service label.

5. The device of claim 1, wherein the access class of the endpoint device is determined from a subscriber identity module of the endpoint device.

6. The device of claim 1, wherein the request from the endpoint device to increase the priority of the traffic identifies a type of traffic, from among a plurality of different types of traffic, for which an increase to the priority of the traffic is requested.

7. The device of claim 6, wherein the network element comprises:
the cellular base station;
a base transceiver station;
a NodeB;
an eNodeB;
a serving gateway; or
a packet data network gateway.

8. The device of claim 1, wherein the request from the endpoint device to increase the priority of the traffic identifies a destination for which the increase to the priority of the traffic is requested when the traffic is between the endpoint device and the destination.

9. The device of claim 8, wherein the destination is identified by:
a network address;
a range of network addresses;
a subnet;
a uniform resource locator; or
a telephone number.

10. The device of claim 1, wherein the request indicates a duration of time for the increase to the priority of the traffic.

11. The device of claim 1, wherein the operations further comprise:
storing a user preference for at least one parameter associated with the traffic when the priority of the traffic is increased.

12. The device of claim 11, wherein the at least one parameter comprises:
a minimum bandwidth;
a maximum latency;
a maximum jitter;
a maximum call blocking;
a maximum packet loss;
a second quality of service class indicator; or
the second packet data session quality of service label.

13. The device of claim 12, wherein the second packet data session quality of service label is selected in accordance with the user preference.

14. The device of claim 1, wherein the operations further comprise:
storing a plurality of user preferences for a parameter associated with the traffic when the priority of the traffic is increased;
requesting a selection of one of the plurality of user preferences for the parameter; and
selecting the second packet data session quality of service label in accordance with the selection.

15. A non-transitory computer-readable medium storing instructions which, when executed by a processor in a network, cause the processor to perform operations, the operations comprising:
receiving a request from an endpoint device to increase a priority of traffic associated with the endpoint device, wherein the traffic is associated with a first quality of service class indicator, and wherein the first quality of service class indicator is associated with a first packet data session quality of service label; and
increasing the priority of the traffic in response to the request, the increasing the priority of the traffic comprising:
sending an instruction to a network element in the network to adjust a mapping of the first quality of service class indicator to a second packet data session quality of service label for the traffic, wherein the network element labels packets in the traffic associated with the endpoint device with the second packet data session quality of service label instead of the first packet data session quality of service label, in response to the instruction, and wherein components of the network process the packets in the traffic labeled with the second packet data session quality of service label with a greater priority than packets labeled with the first packet data session quality of service label; and sending, in response to the request, an instruction to a cellular base station of the network to override an access class of the endpoint device, when the access class of the endpoint device is determined to be one of a first plurality of access classes, wherein the network implements the first plurality of access classes and a second plurality of access classes, and wherein the second plurality of access classes has a greater priority in the network than the first plurality of access classes.

16. A method comprising:

receiving, by a processor in a network, a request from an endpoint device to increase a priority of traffic associated with the endpoint device, wherein the traffic is associated with a first quality of service class indicator, and wherein the first quality of service class indicator is associated with a first packet data session quality of service label; and increasing, by the processor, the priority of the traffic in response to the request, the increasing the priority of the traffic comprising:

sending an instruction to a network element in the network to adjust a mapping of the first quality of service class indicator to a second packet data session quality of service label for the traffic, wherein the network element labels packets in the traffic associated with the endpoint device with the second packet data session quality of service label instead of the first packet data session quality of service label, in response to the instruction, and wherein components of the network process the packets in the traffic labeled with the second packet data session quality of service label with a greater priority than packets labeled with the first packet data session quality of service label; and sending, in response to the request, an instruction to a cellular base station of the network to override an access class of the endpoint device, when the access class of the endpoint device is determined to be one of a first plurality of access classes, wherein the network implements the first plurality of access classes and a second plurality of access classes, and wherein the second plurality of access classes has a greater priority in the network than the first plurality of access classes.

17. The method of claim 16, wherein the first packet data session quality of service label and the second packet data session quality of service label comprise differentiated services code points.

18. The method of claim 16, wherein the first packet data session quality of service label and the second packet data session quality of service label comprise type of service labels.

19. The method of claim 16, wherein the request from the endpoint device to increase the priority of the traffic associated with the endpoint device includes at least one parameter comprising:

a minimum bandwidth;
a maximum latency;
a maximum jitter;
a maximum call blocking;
a maximum packet loss;
a second quality of service class indicator; or
the second packet data session quality of service label.

20. The method of claim 16, wherein the access class of the endpoint device is determined from a subscriber identity module of the endpoint device.

* * * * *